(12) United States Patent
Linnell

(10) Patent No.: US 9,488,901 B1
(45) Date of Patent: Nov. 8, 2016

(54) CROWD-DEPLOYABLE OBJECTS TO CONTROL A PRESENTATION

(71) Applicant: Bot & Dolly, LLC, San Francisco, CA (US)

(72) Inventor: Jeffrey Linnell, Woodside, CA (US)

(73) Assignee: Bott & Dolly, LLC, San Francisco, CA (US)

( * ) Notice: Subject to any disclaimer, the term of this patent is extended or adjusted under 35 U.S.C. 154(b) by 125 days.

(21) Appl. No.: 14/490,340

(22) Filed: Sep. 18, 2014

Related U.S. Application Data

(60) Provisional application No. 61/882,588, filed on Sep. 25, 2013.

(51) Int. Cl.
*H04N 9/31* (2006.01)
*G03B 21/20* (2006.01)

(52) U.S. Cl.
CPC ........ *G03B 21/2046* (2013.01); *H04N 9/3147* (2013.01); *H04N 9/3194* (2013.01)

(58) Field of Classification Search
CPC .. G03B 21/142; G03B 21/147; G03B 21/26; G03B 21/58; G03B 21/562; H04N 9/3185; H04N 9/3188; H04N 9/3182; H04N 9/3194; H04N 9/3147; F21V 23/0478; G06F 3/0346; G06F 3/03; G06F 3/0325
See application file for complete search history.

(56) References Cited

U.S. PATENT DOCUMENTS

| | | | | |
|---|---|---|---|---|
| 5,969,754 A * | 10/1999 | Zeman | ................. | G09B 21/008 348/136 |
| 5,993,314 A | 11/1999 | Dannenberg et al. | | |
| 6,554,431 B1 * | 4/2003 | Binsted | ................. | H04N 9/3194 348/E5.137 |
| 6,677,956 B2 * | 1/2004 | Raskar | ................. | G06T 15/503 345/419 |
| 6,930,681 B2 * | 8/2005 | Raskar | ................. | G06T 15/005 345/419 |
| 7,019,748 B2 * | 3/2006 | Raskar | .................... | G06T 13/20 345/423 |
| 7,068,274 B2 * | 6/2006 | Welch | .................... | G06T 13/20 345/426 |
| 7,134,080 B2 * | 11/2006 | Kjeldsen | .................. | H04N 5/74 348/E5.137 |
| 7,252,387 B2 * | 8/2007 | Raskar | .................... | H04N 5/74 348/746 |
| 7,530,019 B2 * | 5/2009 | Kjeldsen | .................. | H04N 5/74 715/730 |
| 8,085,163 B1 | 12/2011 | Wells et al. | | |
| 8,589,796 B2 * | 11/2013 | Moesgaard Kjeldsen | ................ | G03B 21/28 715/730 |
| 8,933,974 B1 * | 1/2015 | Marason | ................ | G09G 3/002 345/690 |
| 9,132,346 B2 * | 9/2015 | Huebner | ................. | A63F 13/06 |

(Continued)

FOREIGN PATENT DOCUMENTS

EP 2347809 7/2011
WO 01/26073 4/2001

*Primary Examiner* — Bao-Luan Le
(74) *Attorney, Agent, or Firm* — McDonnell Boehnen Hulbert & Berghoff LLP

(57) ABSTRACT

Example methods and systems may help to provide for crowd control of a visual presentation, such as a laser light show. One example method includes causing a visual presentation to be displayed within an environment, receiving position information from at least one sensor on a manually movable object within the environment, determining a translation and an orientation of the object in three-dimensional space based on the position information from the at least one sensor, and causing the visual presentation to move in three-dimensional space based on one or more changes in the translation and orientation of the object.

20 Claims, 17 Drawing Sheets

(56) References Cited

U.S. PATENT DOCUMENTS

| | | | |
|---|---|---|---|
| 2003/0034974 A1* | 2/2003 | Welch | G06T 13/20 345/426 |
| 2003/0034976 A1* | 2/2003 | Raskar | G06T 15/005 345/427 |
| 2003/0038822 A1* | 2/2003 | Raskar | G01B 11/2504 345/632 |
| 2003/0043152 A1* | 3/2003 | Raskar | G06T 13/20 345/473 |
| 2003/0052890 A1* | 3/2003 | Raskar | G06T 15/503 345/581 |
| 2004/0036717 A1* | 2/2004 | Kjeldsen | H04N 5/74 715/730 |
| 2006/0209268 A1* | 9/2006 | Raskar | H04N 5/74 353/69 |
| 2007/0013716 A1* | 1/2007 | Kjeldsen | H04N 5/74 345/594 |
| 2008/0218641 A1* | 9/2008 | Kjeldsen | H04N 5/74 348/746 |
| 2015/0029314 A1* | 1/2015 | Reichow | H04N 13/0459 348/51 |

* cited by examiner

CROWD-DEPLOYABLE OBJECTS TO CONTROL A PRESENTATION

CROSS REFERENCE TO RELATED APPLICATION

The present application claim priority to U.S. Provisional patent application Ser. No. 61/882,588, filed on Sep. 25, 2013, and entitled "Tracking the Position of Crowd-Deployable Objects to Display a Presentation," which is herein incorporated by reference as if fully set forth in this description.

BACKGROUND

Unless otherwise indicated herein, the materials described in this section are not prior art to the claim in this application and are not admitted to be prior art by inclusion in this section.

Projected beams of light are sometimes used in the entertainment industry to create laser light shows. For instance, a light show may consist of projected light beams to accompany a musical performance or some other type of entertainment. Laser projectors or other lighting fixtures may be used to project different types of light beams, such as light beams with different colors or frequencies. A computing device may be used to control the projectors through a standard protocol for stage lighting and effects, such as DMX, in order to control aspects of a light show, including directions, sizes, colors, and patterns of projected light beams.

SUMMARY

Example methods and systems may help to provide for crowd control of a visual presentation, such as a laser light show. The visual presentation may be displayed within an environment big enough to hold a group of people, such as a concert venue. One or more manually movable objects, such as helium-filled spheres, may be deployed into the environment. The objects may contain position sensors that may be used to determine the translation and orientation of the objects within the environment. The visual presentation may be controlled to move in three-dimensional space based on changes in translation and orientation of the object(s). Accordingly, people in the crowd may be able to influence the presentation by causing movements of the object(s) deployed within the environment.

In one example, a method is provided that includes causing a visual presentation to be displayed within an environment, receiving position information from at least one sensor on a manually movable object within the environment, determining a translation and an orientation of the object in three-dimensional space based on the position information from the at least one sensor, and causing the visual presentation to move in three-dimensional space based on one or more changes in the translation and orientation of the object.

In another example, a system is provided that includes a manually movable object that contains at least one sensor that is configured to detect position information and a control system. The control system may be configured to cause a visual presentation to be displayed within an environment, receive the position information from the at least one sensor on the manually movable object that is deployed within the environment, determine a translation and an orientation of the object based on the position information from the at least one sensor, and cause the visual presentation to move in three-dimensional space based on one or more changes in the translation and orientation of the object.

In still another example, a method is provided that includes causing a visual presentation to be displayed within an environment, receiving position information from at least one sensor on each of a plurality of manually movable objects within the environment, determining a translation and an orientation of each of the plurality of objects in three-dimensional space based on the position information from the at least one sensor on each of the plurality of objects, and causing the visual presentation to move in three-dimensional space based on a combination of the translation and orientation of each of the plurality of objects.

In yet another example, a system may include means for causing a visual presentation to be displayed within an environment, means for receiving position information from at least one sensor on a manually movable object within the environment, means for determining a translation and an orientation of the object in three-dimensional space based on the position information from the at least one sensor, and means for causing the visual presentation to move in three-dimensional space based on one or more changes in the translation and orientation of the object.

These as well as other aspects, advantages, and alternatives, will become apparent to those of ordinary skill in the art by reading the following detailed description, with reference where appropriate to the accompanying figures.

DETAILED DESCRIPTION

I. Overview

Figure 1A:
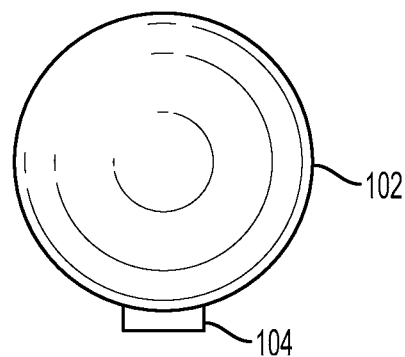
FIG. 1A shows an object with a sensor, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

In numerous applications, it may be useful to disperse control of a system across a number of different people in a crowd. For example, example embodiments may be configured to give multiple individuals in a crowd at a music concert some degree of control over the performance as it is happening. While no one person controls the performance, each individual may be given the ability to contribute to some degree. For instance, the crowd may collectively be able to control audiovisual effects such as lighting effects, sound effects, and/or mechanical stage components, in real time. As another example, a group of people may be able to play a game together where the movement of a character is controlled by all of the people in the group working together. Each person may be able to influence what the character does, but no one person has complete control. In a further example, a large group of people may be riding on a ship, and collectively the group may be able to steer the ship by each contributing some degree of influence over the ship's trajectory.

Example systems and methods may provide an interface for collective control to a group of people for these and other applications. In some embodiments, an interface may be provided by one or more physical objects that are deployed into the group of people, such that a number of people have at least some ability to influence the movement of the objects. For example, one or more large helium-filled spherical balls may be dispersed over a crowd at a concert. Each of the spheres may be equipped with one or more internal or external sensors that enable a control system to determine the position of the spheres. From the sensor data, the translation and orientation of the spheres may be continuously updated. The translation and orientation of the spheres may then be used to control one or more aspects of an audiovisual presentation. Accordingly, by controlling audio and/or visual display elements based on the movement and/or rotation of the spheres in space, an illustrative embodiment may provide members of the crowd with the ability to affect the presentation in real time.

A wide variety of objects could be used to achieve communal crowd control. Some objects could be easily deployable over a crowd such as light, helium-filled, inflatable balls or large balls made from soft foam. Other shapes could be used in addition to or instead of spheres as well. In some examples, the shapes may have one or more reflective surfaces. For instance, a three-dimensional diamond or a disco ball with numerous flat surfaces could be used. Some presentations may take advantage of this additional mathematical geometry, for example, by bouncing lights off the reflective surfaces. Many smaller objects could be used as well. For instance, small objects could be distributed to individuals in a crowd or they could be placed under the chairs of crowd members to be retrieved after the people enter.

Each of the objects may be equipped with one or more internal or external sensors capable of determining position. Example sensing systems may employ LED tags with witness cameras, GPS, transponders, and/or accelerometers, for example. The objects may be capable of moving in up to six degrees of freedom. Specifically, the objects may be capable of translation along three perpendicular axes (forward/backward, up/down, and left/right) as well as rotation about the three perpendicular axes (pitch, yaw, and roll). Accordingly, the sensors may be used to determine the translation and rotation (six degrees of freedom) of the objects relative to a world frame. Multiple sensors may be used at multiple points on the objects to provide increased precision.

By using the data from the sensors, one or more aspects of a presentation may then be controlled based on the movements of the objects. Therefore, individual members of the crowd may be able to influence the presentation by directing an object. If multiple objects are used, then the positions of the multiple objects may be averaged together or combined in some other way in order to control the presentation. The presentation could rely on the translation of the objects, the rotation of the objects, or a combination of the two. In further examples, one or more of the sensors placed on the objects may be capable of detecting other information indicative of movement of the objects besides position. For instance, the sensors may be capable of detecting acceleration of an object or vibrations in the object's material. In some examples, this information may be transmitted to a control system and used by the control system to control aspects of the presentation as well.

As a specific example, a ball could be deployed into a crowd at a concert, and movements of the ball could be used to control a light show above the crowd. For instance, the ball could be positioned at a corner point of a giant cube of projected light, which may be formed using a combination of light projectors and mirrors. As the crowd moves and rotates the ball, the projectors and mirrors could be controlled so that the cube of light moves and rotates in synchronization with the ball. In this manner, the crowd could collectively use a 10-foot-diameter ball to control the movement of a 20-story cube of light. To accomplish this effect, a control system could communicate with each of the light projectors and mirrors. The control system may continuously compute the necessary translations and orientations of the light projectors and mirrors to keep up with the ball as it moves within the crowd. In one example, the light projectors and/or mirrors may be attached to robotic arms that are in communication with the control system to allow for more degrees of freedom. In another example, the ball could be used to control a cube of light high in the air above the crowd rather than connecting directly to the cube. Other aspects of the projected light such as color could be controlled by movements of the ball (e.g., changes in translation and/or changes in rotation) in a similar manner.

In other examples, different aspects of a presentation could be controlled by movements of the one or more objects in addition to or instead of visual effects. For instance, the amplitude and/or frequency of sound effects could be synched to movements of the objects. Referring back to the ball in a concert crowd example, rotating the ball in one direction may increase the beat while rotating in the opposite direction may slow the beat. In additional examples, movements of the objects could also be used to control video animations on a screen. For instance, animated characters could move on a screen in synchronization with movements of the ball. In some examples, these aspects controlled by a crowd may be used to allow a large number of people to play a competitive game against each other, where each player has some amount of influence over the outcome.

The objects may therefore effectively function as giant joysticks that allow large groups of people to actively participate in controlling some type of presentation or outcome. Numerous applications of the disclosed systems and methods for giving a crowd shared control of a presentation are possible.

II. Example Deployable Objects

A variety of different types of objects with different shapes, sizes, and/or materials that may be directable by people in a crowd could be used. One example object that may work well for certain applications is a large, helium-filed, inflatable ball. Such an object may be easily moved and rotated through space by people who may hit, tap, punch, push, bounce, or otherwise affect the ball's trajectory. In some examples, the object may float in the air or come down slowly in a controlled manner and/or with a low terminal velocity so that it can be safely deployed over a crowd. In further examples, lightweight material may be used to construct the object so that it can easily be held up in the air by people in the crowd. For instance, instead of using an inflatable object, light foam materials may be used to construct the object.

In additional examples, a large number of smaller objects may be deployed into a crowd of people. For example, 10 or 100 or 1,000 smaller balls could be deployed into the crowd. In other examples, the objects could be aerodynamic in shape so that they may easily be passed around and/or maneuvered by people in a crowd. For instance, balls shaped like footballs could be used instead of spheres. In yet further examples, some objects may have one or more relatively flat surfaces, such as a three-dimensional diamond or a disco ball. In some applications, the material used to make these objects may be reflective so that beams of light can be bounced off the surfaces of the objects.

FIG. 1A shows an example ball 102 that contains an external sensor 104 for determining the position of the ball. A wide variety of different types of sensors could be used to enable a control system to determine the position of the ball. For instance, the sensor 104 could include a transponder that transmits and/or receives electromagnetic signals to a control system. The sensor 104 could also include one or more light emitting diodes (LEDs) that may be used in conjunction with one or more witness cameras to record the position of the ball 102. The LEDs (or another type of electromagnetic transmitter) could transmit visible light signals, ultraviolet light signals, and/or infrared light signals, for example. In other examples, the LEDs could be pulsed at one or more chosen frequencies.

Figure 1B:
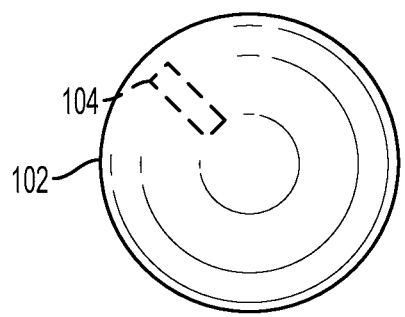
FIG. 1B shows another object with a sensor, according to an example embodiment.

In further examples, one or more internal sensors could be used in addition to or instead of external sensors in order to determine positioning of the objects. FIG. 1B shows an example ball 102 that contains an internal sensor 104 for determining the position of the ball. The internal sensor 104 is shown here affixed to the inside of the ball 102, but it could be attached in other ways as well. For instance, wires could be used to position the sensor 104 in the middle of the ball 102 so that the weight of the sensor 104 is distributed evenly across the ball 102. The internal sensor 104 could be an electromagnetic transmitter that transmits a signal which can pass through the material of the ball 102, such as a radio frequency (RF) signal. In other examples, the internal sensor 104 could include a global position system (GPS) sensor.

In further examples, computer vision could be used as well. For example, one or more cameras could provide video of an object. A computing system could analyze sequential video frames from the one or more cameras in order to determine movements and/or rotations of the object between the frames. This type of computer vision could be used to determine translation and/or orientation of an object on its own or it could be used in conjunction with one or more physical internal or external sensors placed on the object.

Figure 1C:
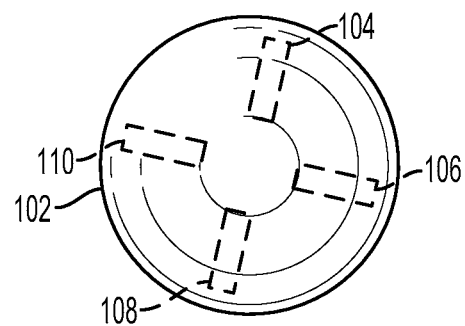
FIG. 1C shows an object with multiple sensors, according to an example embodiment.

In additional examples, sensors may be positioned at multiple points on an object. FIG. 1C shows an example ball 102 with multiple internal sensors 104, 106, 108, and 110. Each sensor could be a transponder that transmits a separate signal, for example, a signal with a unique frequency. By receiving signals from multiple points on the object, a control system may be able to more accurately determine the position of the object in space. In other examples, external sensors could also be placed at multiple points on the outside of the object. For instance, bright reflective markers could be placed at multiple points on the object, and a camera's threshold could be adjusted so that only the bright reflective markers are sampled. Then, motions of the object can be recorded by identifying motions of the reflective markers similar to the way that a dark motion capture suit covered with bright ping pong balls can be used to determine the movements of an actor.

In some examples, an object may be manually moveable with six degrees of freedom by people in a crowd. For example, an object may be capable of translation along each of the three perpendicular axes (forward/backward, up/down, and left/right). Additionally, the object may be capable of rotation about the three perpendicular axes (pitch, yaw, and roll). For such objects, one or more of the sensor systems described above may be used to determine movements along each of the six degrees of freedom. In other examples, objects may be restricted to fewer degrees of freedom. For instance, the object could be a large block on the floor. People in a crowd may be able to slide the block forward and back and left and right, but not up or down. In such examples, sensors may be selected that are capable of detecting each of the possible motion paths of the object.

In further examples, objects could be equipped with sensors capable of detecting additional properties about the object as well. For instance, an accelerometer may be placed inside an object and used to detect the magnitude and direction of the acceleration of the object. An accelerometer or other type of sensor may also be used to detect vibration in the object's material. The amplitude of the vibrations may be indicative of the force with which people in the crowd struck or pushed the object, for example. Sensors directly measuring contact or force could also be included to measure when the object has been struck or pushed. Quantifications of these additional aspects could be sent to a control system and used in addition to or instead of the object's position to control aspects of a presentation.

III. Example Applications

Numerous applications of crowd-deployable objects with sensors for determining position are possible. It should be understood that the examples given in this section are meant to show how this type of system could be used to give a group of people shared control of some visual audio, or other type of output. The range of possible outputs is quite broad, and the examples given here are not meant to be limiting.

Figure 2A:
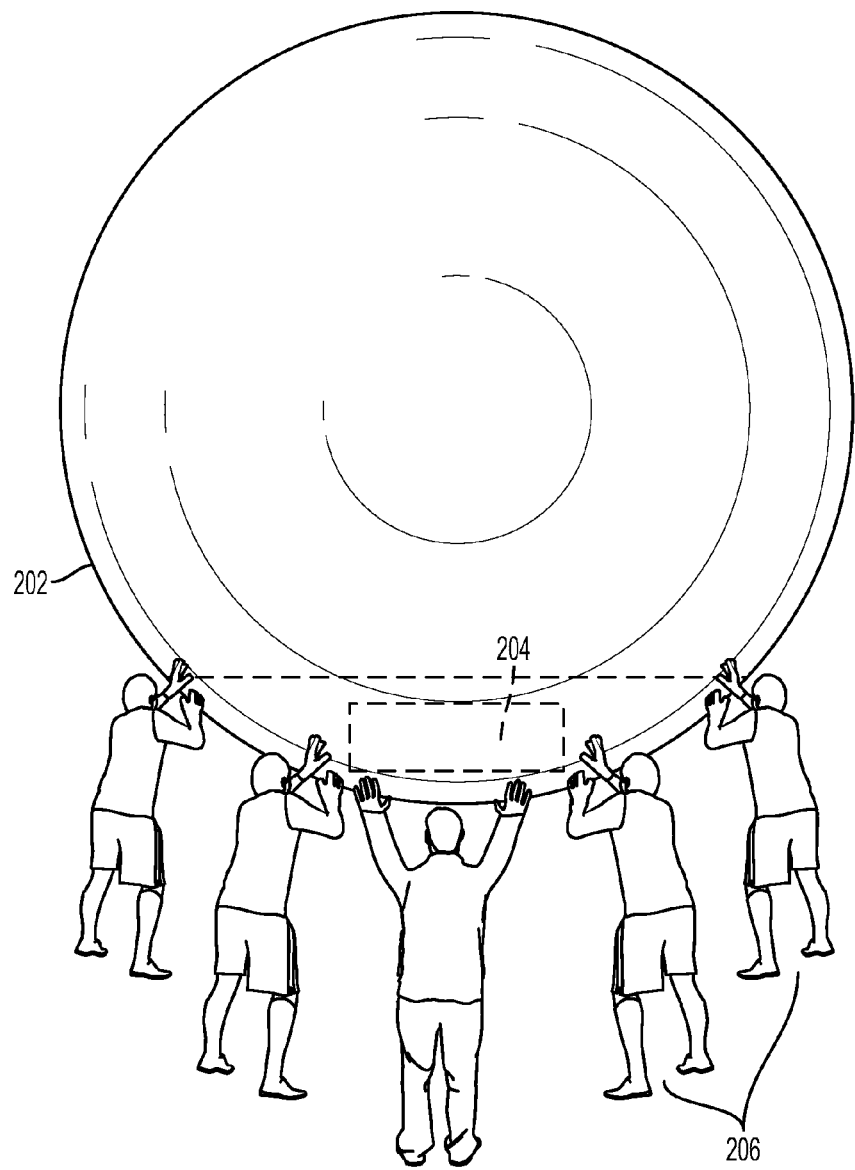
FIGS. 2A-2D illustrate an example of an object deployed in a crowd, according to an example embodiment.

FIG. 2A shows an example object 202 containing an internal sensor 204 for determining the object's position. The object and the sensor could be any of the types described in the previous section. Here, the object is shown as a large, light, inflatable ball 202. The sensor 204 is shown affixed to the inside of the bottom of the ball 202, but the sensor 204 could be attached in other ways and/or at other points as well. In the figure, the ball 202 has been deployed into a group of people 206 who may be capable of influencing movements of the ball 202. The ball 202 could be deployed into the crowd 206 in a number of possible ways, such as by dropping the ball 202 into the crowd 206 or by positioning the ball 202 inside a performance area before the crowd 206 enters. Depending on the size and type of the object 202, it could be deployed in a number of other ways as well.

As shown in FIG. 2A, each of the people 206 may be able to influence movements and/or rotations of the ball 202. The ball 202 may be a light, inflatable ball such that the people 206 can easily change the translation and/or orientation of the ball 202 by slapping it, pushing it, punching it, rolling it, etc. Other types of objects may enable people in the group to direct the object in other ways as well. For instance, a smaller ball may be used so that one or more people in the group could pick up the ball and throw it.

Figure 2B:
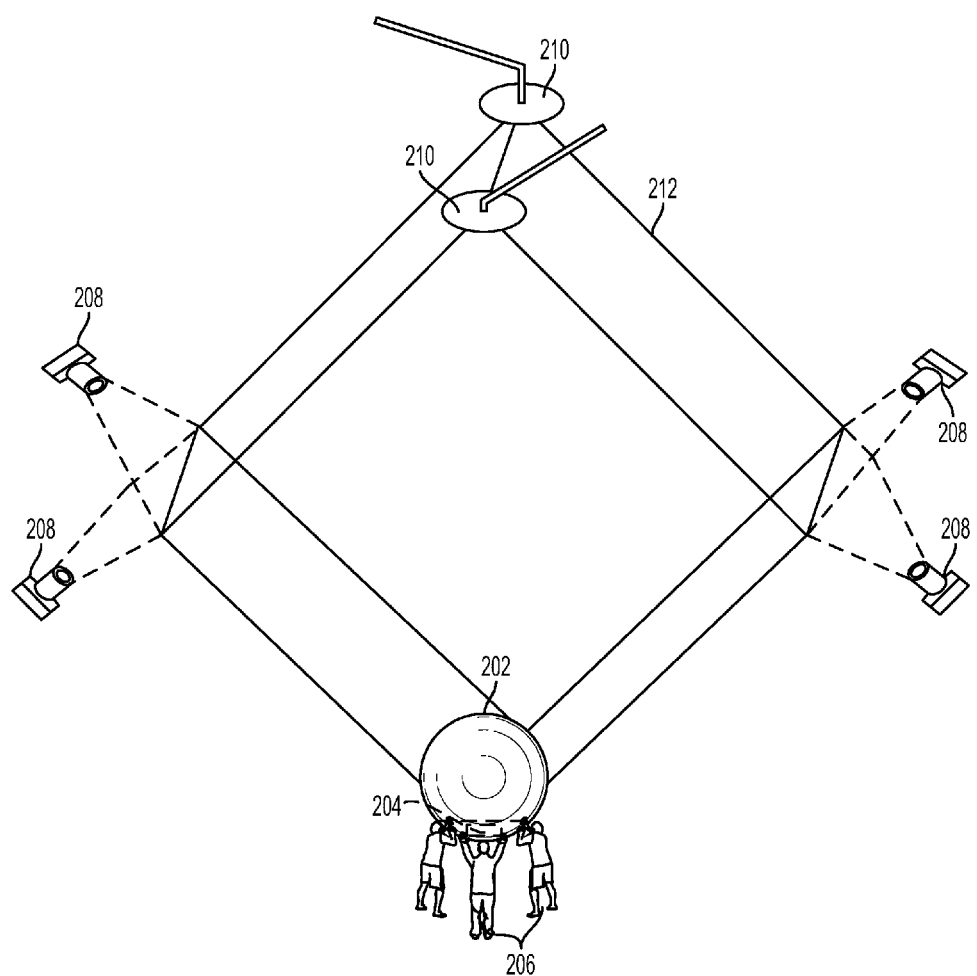

FIG. 2B shows an example light show that could take place at a performance venue, such as at a concert. Multiple light sources 208 may project rays of light into the venue. The light sources could be movable light sources with at least one degree of freedom. In some examples, one or more of the light sources could be head light fixtures, such as head light fixtures with the typical two degrees of freedom. The light sources could also be mounted on tracks that allow for an additional degree of freedom. Other types of light sources such as laser projectors may be used in addition to/instead of moving head lights. In other examples, one or more of the light sources (such as moving head lights or some other light source) could be mounted on robotic arms that may allow the light to be projected with additional degrees of freedom.

Also shown in FIG. 2B are multiple mirrors 210 that may operate to reflect light projected by the light sources 208. The mirrors 210 may also be operable to move and/or rotate along one or more degrees of freedom. Additionally, a mirror 210 may be mounted on a robotic arm that may be able to control the location and orientation of the mirror 210, which may allow the mirror to move with additional degrees of freedom to reflect light beams in different directions.

In some examples, a control system (not shown) may be programmed to control the position and/or orientation of the light sources 208 and/or the mirrors 210 directly. In other examples, the control system may control the position and/or orientation of the light sources 208 and/or mirrors 210 indirectly by controlling movements of robotic arms on which the light sources 208 and/or mirrors 210 are mounted on. Control may also be dispersed across multiple different computing systems in some examples.

The control system may control movements of the light sources 208 and/or mirrors 210 in order to display a coordinated presentation. For example, multiple light sources 208 and/or mirrors 210 could be used to project a giant cube of light 212 over a crowd at a concert, as shown in FIG. 2B. The cube of light 212 may be aligned so that the ball 202 held up by members of the audience 206 is located at a corner point of the cube of light 212. This is just one example of a type of presentation that might incorporate the position of the ball 202 within a crowd.

Figure 2C:
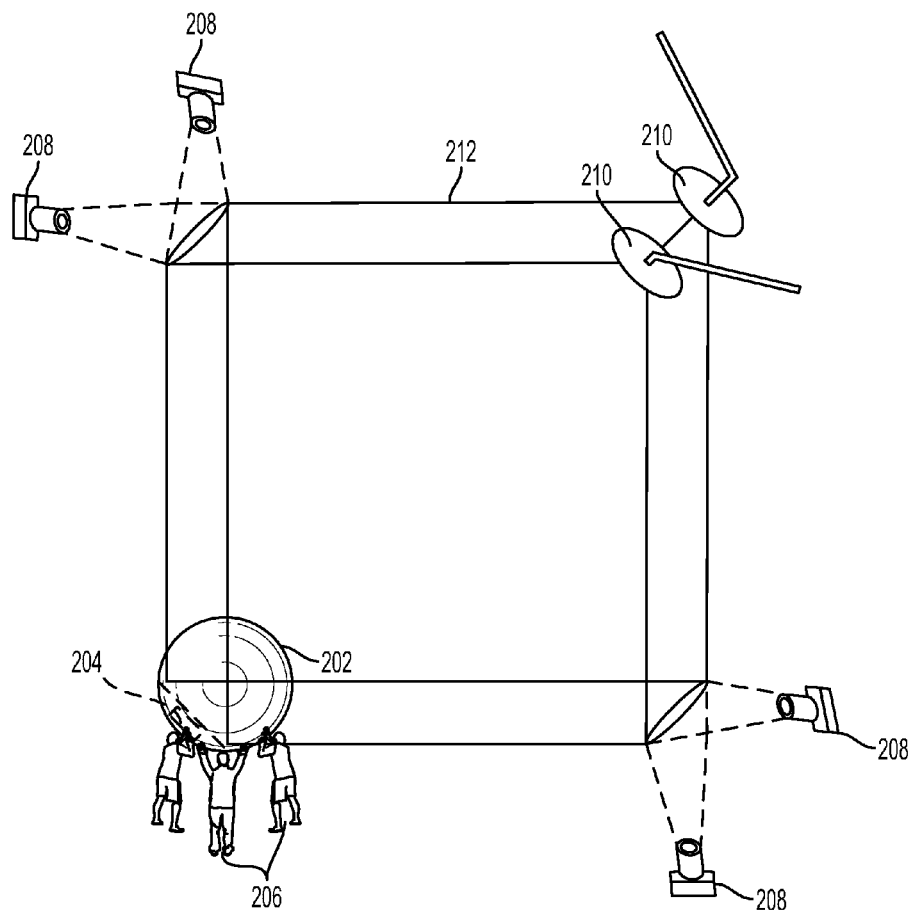

In FIG. 2C, the ball 202 has been rotated relative to the ground as shown. One or more members of the audience 206 may have affected the orientation of the ball 202 by pushing or rolling it, for example. The sensor 204 within the ball 206 may enable a control system to determine that the orientation of the ball 202 has changed relative to a predefined world frame. The control system may then cause one or more of the light sources 208 and/or mirrors 210 to change translation and/or orientation so that the cube of light 212 moves to follow the rotation of the ball 202. More specifically, the orientation of the cube of light 212 relative to the world frame may be made to change in the same direction and by the same amount as the change in orientation of the ball 202. Accordingly, the people 206 in the crowd may experience an effect of being able to rotate the giant cube of light 212 by rotating the ball 202.

To determine the proper translations and/or orientations of the light sources 208 and/or mirrors 210, a control system may need to perform rapid computations to determine how to make the cube of light 212 follow movements of the ball 202. In some examples, these computations could be performed by a separate computing device in communication with the light sources 208, mirrors 210, and/or robotic arms holding the light sources 208 and/or mirrors 210. Alternatively, some or all of the computations could be performed locally by control systems of the light sources 208, mirrors 210, and/or robotic arms holding the light sources 208 and/or mirrors 210. Computations could be carried out by multiple computing devices in communication with each other as well.

Figure 2D:
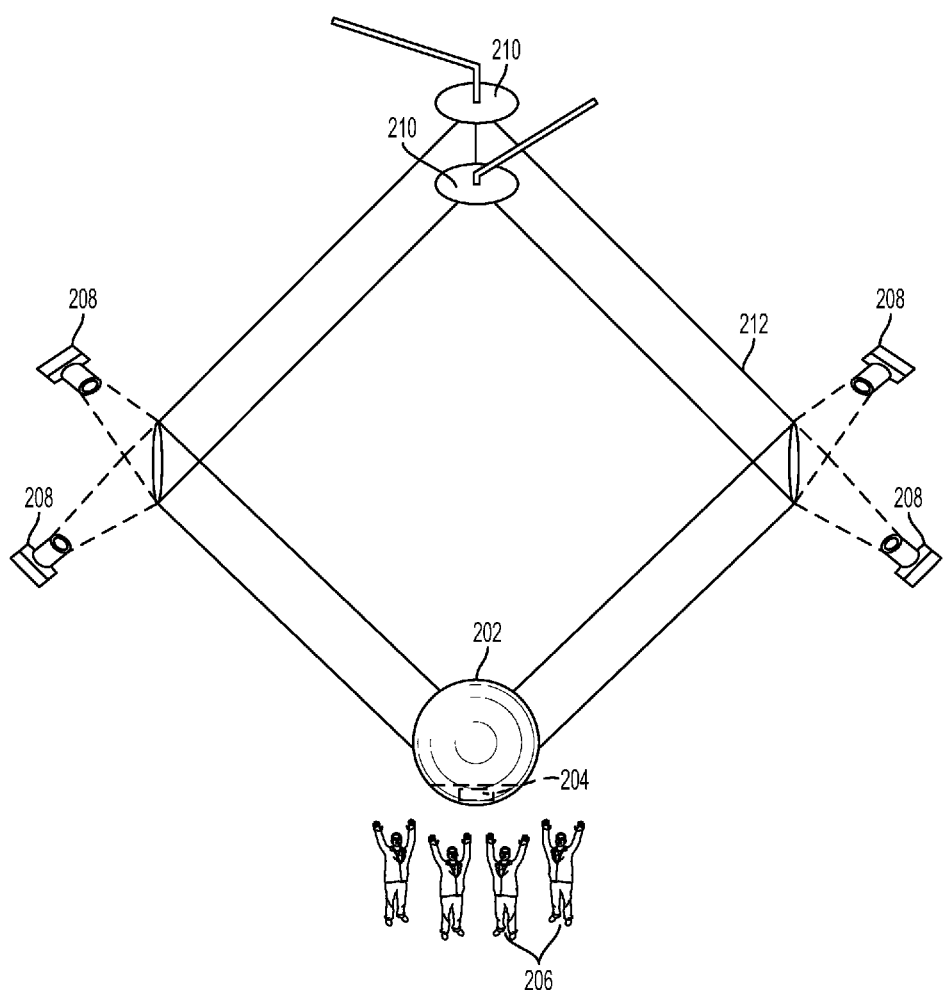

FIG. 2D shows the ball 202 elevated up in the air. For instance, the ball 202 may be light enough that people 206 in the audience may be able to throw the ball 202 a significant distance upward. In addition to determining rotations of the ball 202, the sensor 204 may enable a control system to determine translations through space of the ball 202 as well. In this case, the control system may determine that the ball 202 has been translated upward by a certain amount relative to a world frame. The control system may then determine the necessary locations and/or orientations of the light sources 208 and/or mirrors 210 in order to cause the cube of light 212 to shift upward by the same offset amount as the ball 202. Accordingly, by throwing the ball 202 upward in the air, the audience members 206 may experience a sensation of being able to physically move the giant cube of light 212.

Figure 3A:
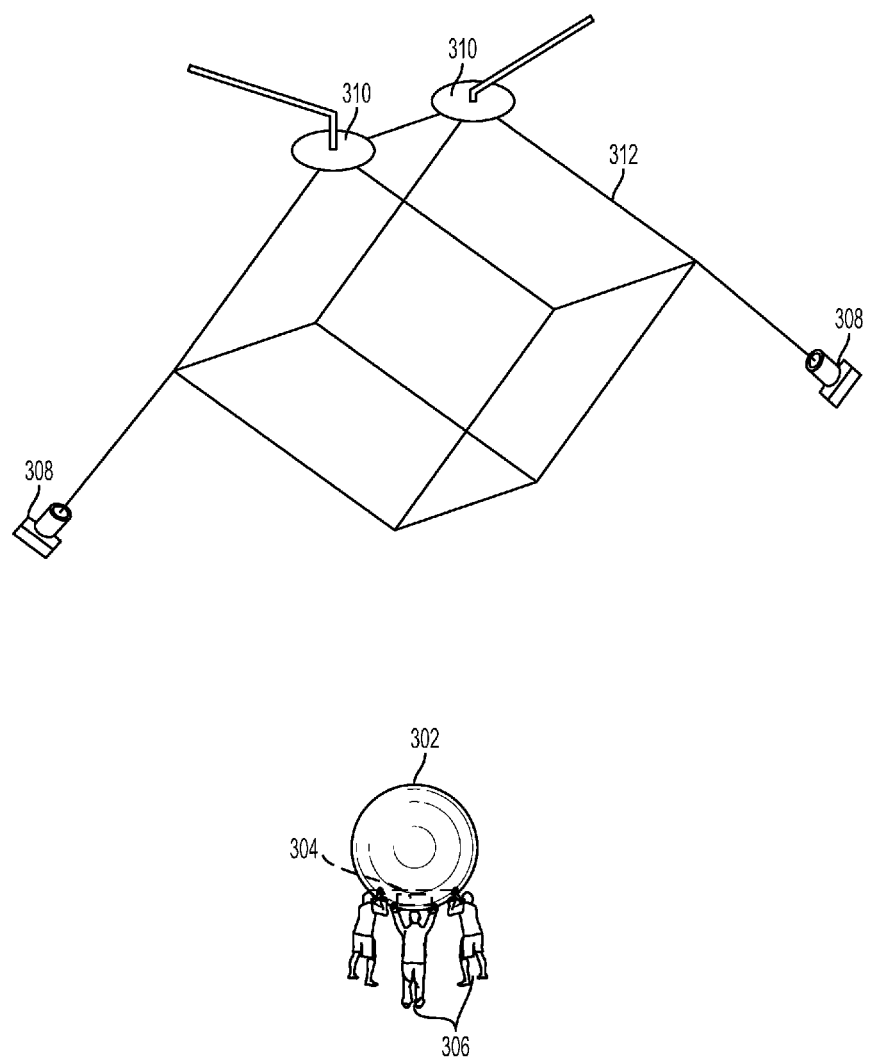
FIGS. 3A-3C illustrate another example of an object deployed in a crowd, according to an example embodiment.

In some examples, movements of the object may be used to control a visual presentation that is far away in distance from the object. For instance, FIG. 3A shows another example of a ball 302 with a position sensor 304 in a group of people 306. In this case, the projected light show may take place high above the people 306 in the crowd. For instance, light sources 308 and mirrors 310 may be used to project a cube of light 312 which is remote from the crowd of people 306 and the ball 302. In this example, the position of the ball 302 may be continually determined so that the cube of light 312 can follow movements of the ball 302 even though the ball 302 and the cube of light 312 are not connected.

Figure 3B:
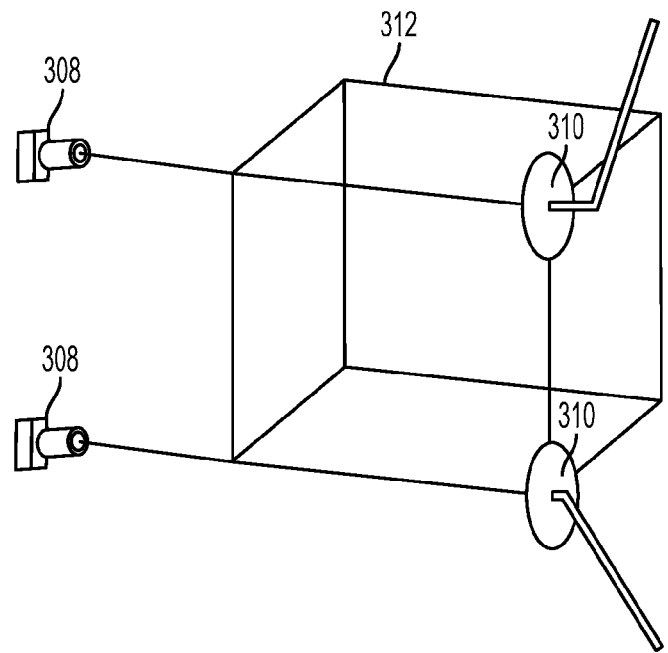
Figure 3B:
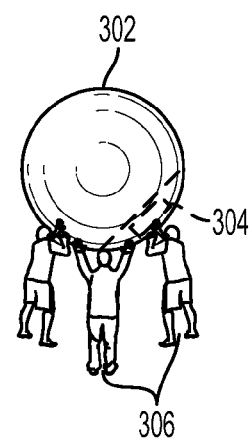

For example, as shown in FIG. 3B, the ball 302 may be rotated relative to the ground. From the sensor 304 within the ball 302, a control system may determine the direction and amount of rotation of the ball 302 relative to a world frame. The control system may then determine the proper locations and/or orientations of the light sources 308 and/or mirrors 310 so that the cube of light 312 rotates in the same direction and amount relative to the world frame as the ball 302 rotated.

In some examples, the effect on the visual performance of movements of the ball 302 may not be a direct, one-to-one relationship. For instance, the cube of light 312 could be made to rotate in the same direction as the ball 302, but the amount of rotation could be increased or decreased according to a certain scalar multiple. For instance, it may be desirable to magnify the effect rotations of the ball 302 by having the cube of light 312 rotate in the same direction as the ball 302, but by an angle that is five times greater or ten times greater.

Figure 3C:
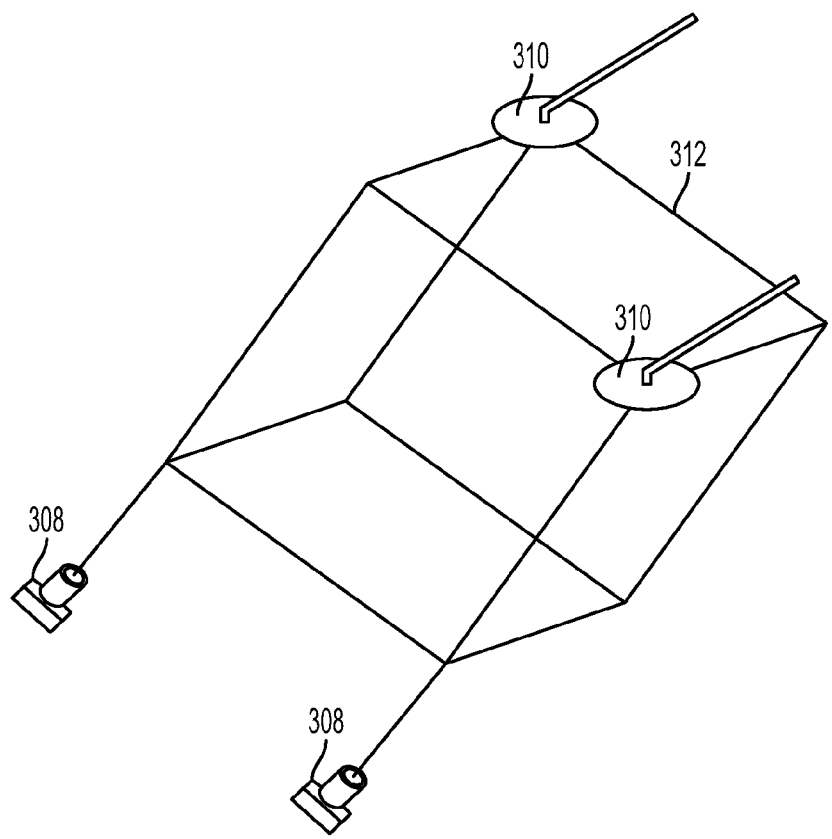
Figure 3C:
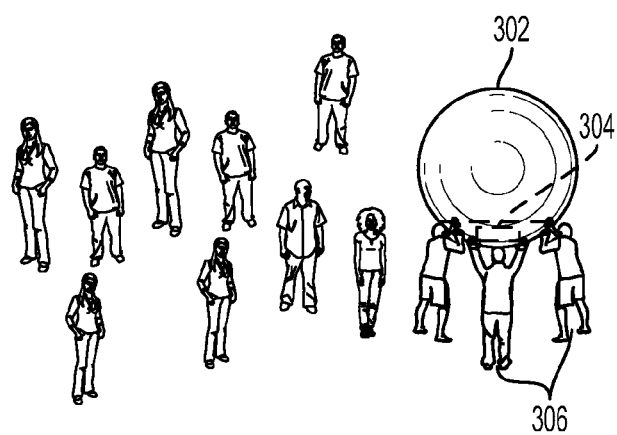

Additionally, translations of the ball 302 could also be increased or decreased by a scalar multiple. For instance, as shown in FIG. 3C, people 306 in the crowd may pass the ball 302 to the right by about fifty feet. This movement may be detected using the sensor 304 inside the ball 302. A control system may then cause the cube of light 312 to move to the right by a scalar multiple of fifty feet. For instance, movements of the ball 302 could be magnified by a factor often such that the control system may cause the cube of light 312 to move to the right by five-hundred feet.

By magnifying the effects of movements of the ball 302, the ball 302 may serve as a giant remote joystick for the people 306 directing the ball 302. This functionality could be useful in other applications as well. For instance, the people 306 may be able to control a character projected far away as part of a competitive game by moving and/or rotating the ball 302. Small movements of the ball may have large impacts on movements of the projected character, for example.

In addition to scaling, movements of the ball 302 could also be transformed or modified in other ways as well or instead. For instance, the people 306 may be able to control a character projected onto a two-dimensional screen through movements of the ball 302. To move the character on the screen, a control system may first transform the movements of the ball 302 from three-dimensional space to two-dimensional space according to a predetermined method. Then, the control system may make the character move according to the movements of the ball that have been transformed into two-dimensional space.

Figure 4A:
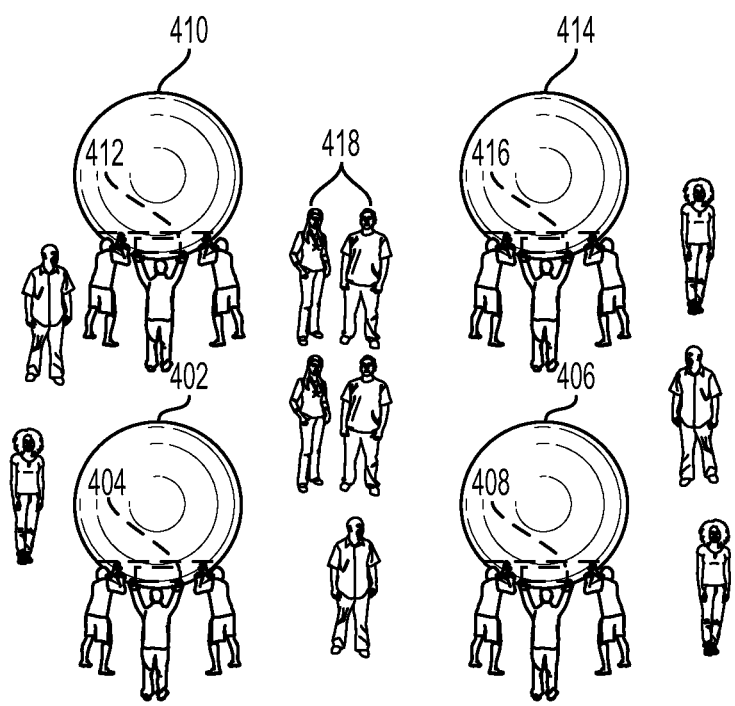
FIGS. 4A-4C illustrate an example of multiple objects deployed in a crowd, according to an example embodiment.

In additional examples, multiple objects with sensors for determining position may be used at the same time. FIG. 4A shows an example of four balls 402, 406, 410, and 414 deployed into crowd of people 418, with each ball containing a position sensor 404, 408, 412, and 416. By using multiple objects simultaneously, some level of control can be given to larger numbers of people. In some examples, hundreds or thousands of balls or other objects with position sensors could be deployed into a crowd. In some cases, it may be desirable to use enough objects so that every member of a crowd can reach at least one object.

Figure 4B:
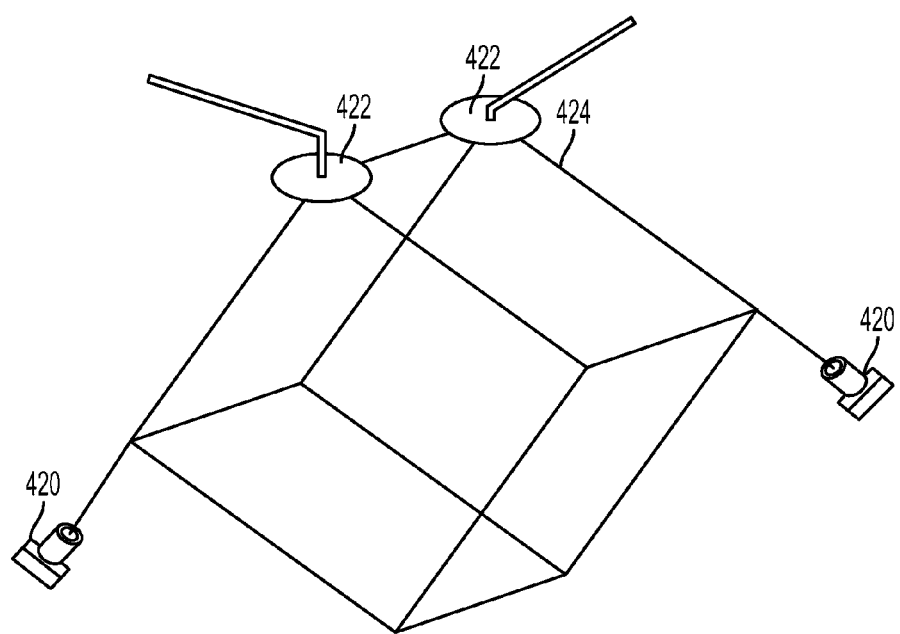
Figure 4B:
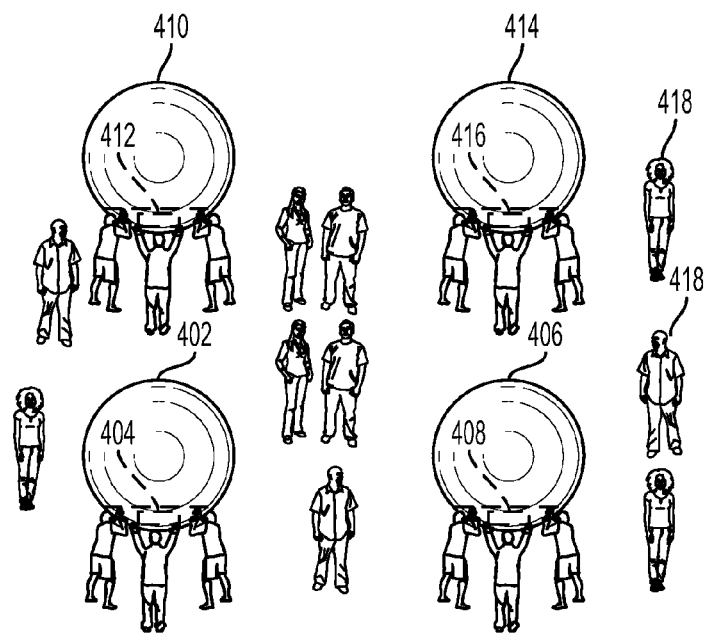

As shown in FIG. 4B, each of the balls 402, 406, 410, and 414 may be deployed into a crowd of people 418 at a performance that includes a light show, such as a concert. A control system may be used to control projectors 420 and/or mirrors 422 in order to project a giant cube of light 424 above the crowd. In this example, movements of the cube of light 424 may be influenced by movements of each of the balls 402, 406, 410, and 414, rather than by movements of a single ball.

Figure 4C:
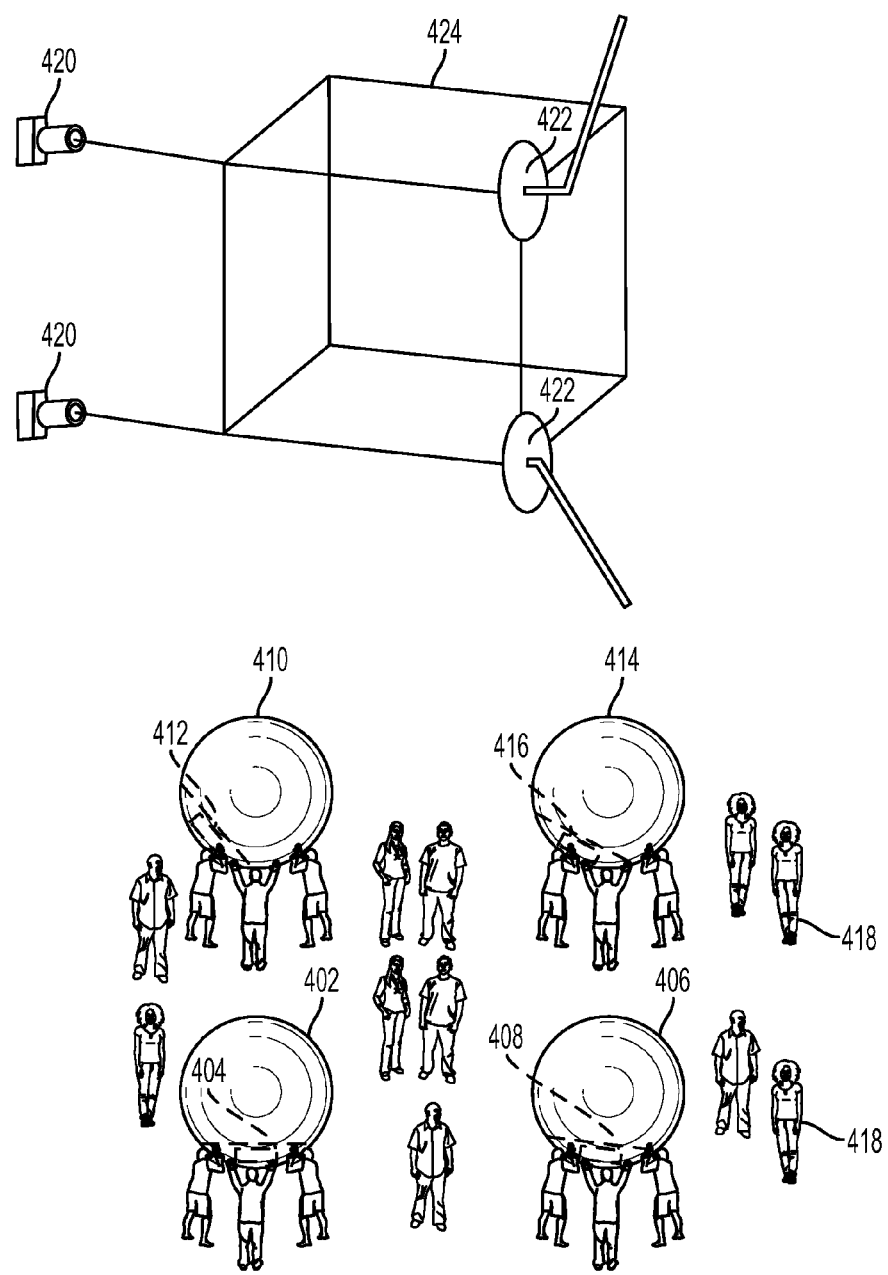

Movements of multiple objects could be used in a number of different possible ways. For example, FIG. 4C shows each of the four balls 402, 406, 410, and 414 being moved by people 418 in the crowd. Each ball may be moved and/or rotated independently in separate directions. A control system may use sensors on each of the balls to determine the position of each of the balls separately. For instance, sensor 404 on ball 402 may indicate that ball 402 has been translated in a particular direction relative to a world frame. Additionally, sensor 408 on ball 406 may indicate that ball 406 has been rotated in a particular direction relative to the same world frame. And so on.

In some examples, this information about the positions of each of the objects could be combined to control an aspect of the presentation. For instance, movements of each of the balls 404, 408, 412, and 416 may be averaged together in order to control movements of the cube of light 424. As shown in FIG. 4C, several of the balls may have been rotated in a particular direction relative to the ground by different amounts. A control system may determine the position of each of the balls, and average the amount of rotation of each of the balls together. Then, the control system may cause the cube of light 424 to rotate relative to the world frame by an amount that corresponds to the average amount of rotation of each of the balls. In this manner, each person 418 in the crowd who is directing one of the balls may be able to contribute some degree of influence over the light show overhead.

In other examples, movements of multiple objects could be combined in different ways as well. For instance, instead of determining an average amount of movement, an effect in the light show (or other aspect of the presentation) may only occur after a majority of the objects move in a certain direction by a particular amount. As another example, movements of the objects may only have an effect after a certain number of objects above a threshold number have been moved in a certain direction by a particular amount.

In further examples, the objects may be divided into groups. Movements of objects within a group may be averaged together to affect aspects of the performance local to the section of the audience controlling the objects. For instance, movements of objects within a group may affect movements of a cube of light directly over that section of the audience. Additionally, movements of the all of the objects within the venue may be averaged together to affect global aspects of the performance at the same time. Movements of multiple objects could be used in other ways as well.

Figure 5A:
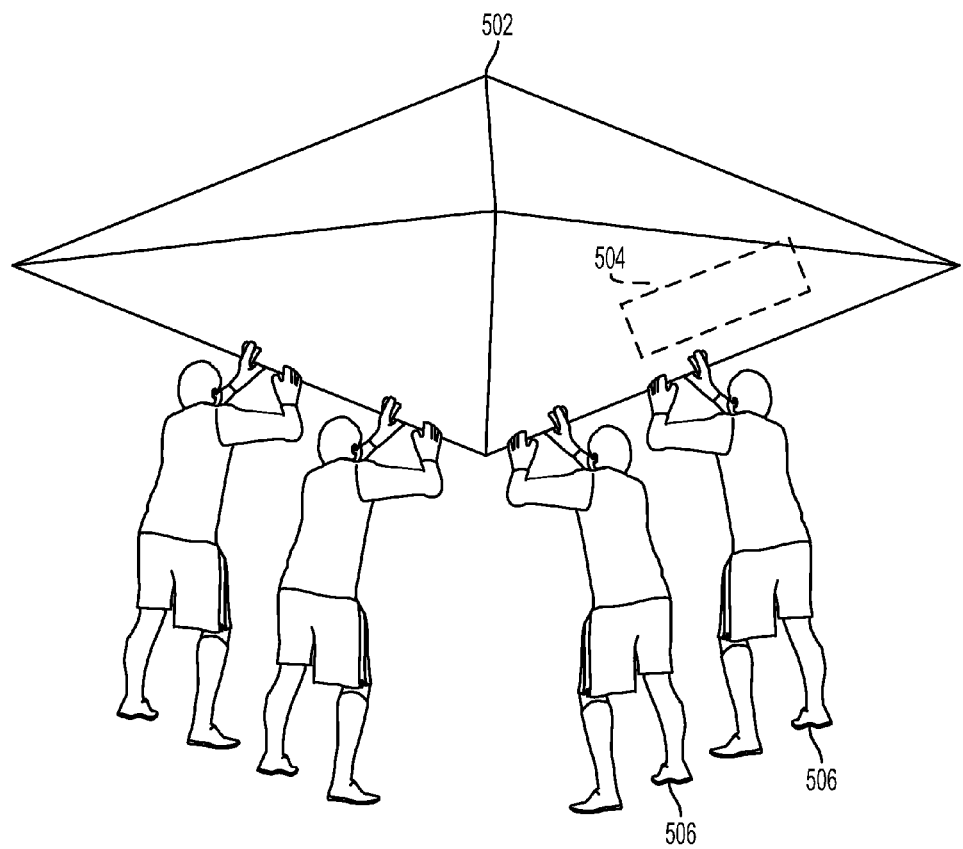
FIGS. 5A-5D illustrate a further example of an object deployed in a crowd, according to an example embodiment.

In some examples, objects with different shapes may be used instead of or in addition to balls. For instance, FIG. 5A shows a three-dimensional diamond-shaped object 502 with a sensor 504 for determining the position of the object 502. Movements of the object 502 may be directed by multiple people 506 in a crowd, such as people at a concert. In some examples, the material used to construct the object 502 may be reflective, and the mathematical geometry of the object 502 may be leveraged by bouncing one or more lights off of the object.

Figure 5B:
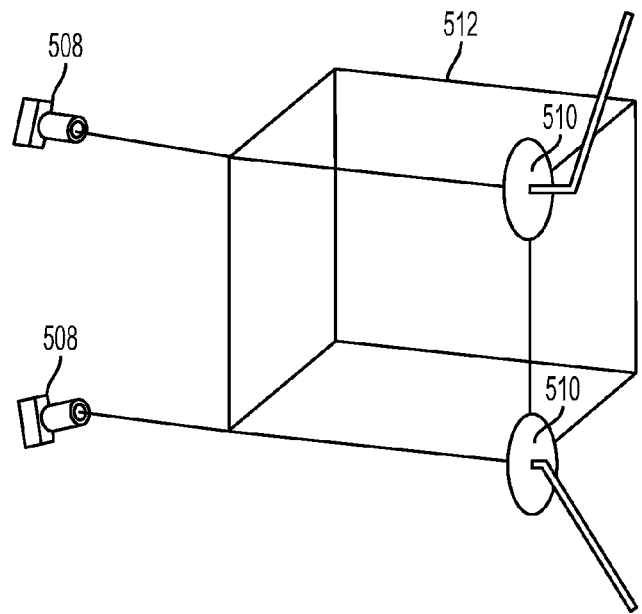
Figure 5B:
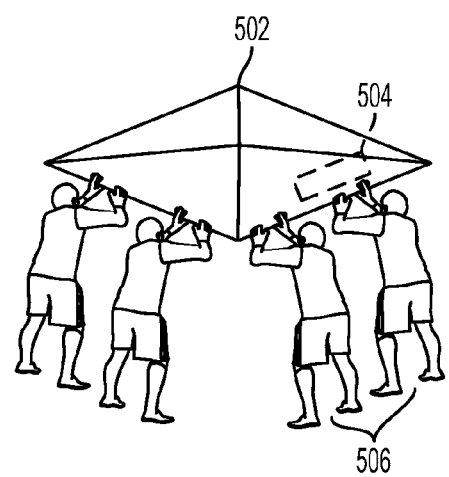
Figure 5C:
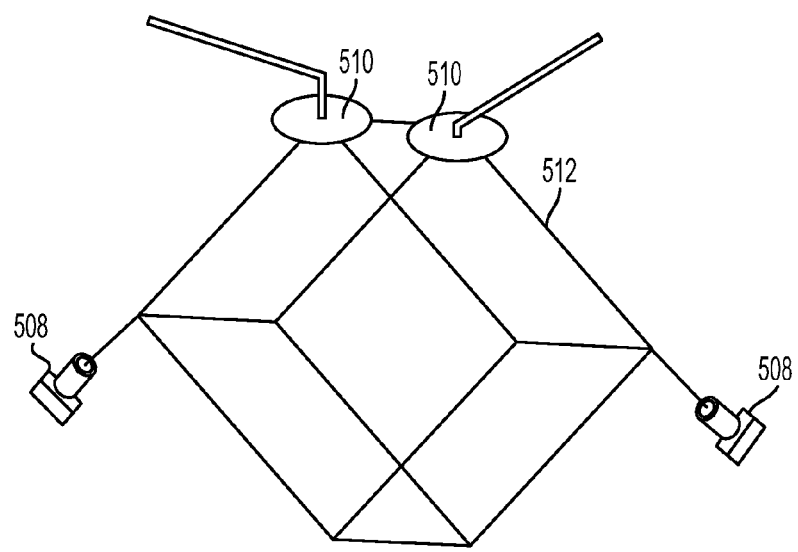
Figure 5C:
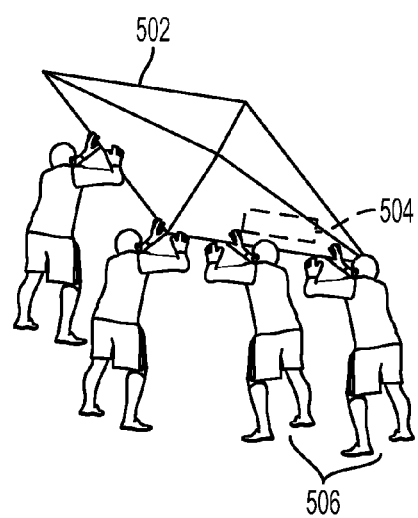

As shown in FIGS. 5B and 5C, movements of the diamond may be used to control aspects of a presentation in a similar manner to movements of a ball. Like a ball, a three-dimensional diamond may be manually movable along each of six degrees of freedom. Accordingly, a control system can determine changes in translation and/or rotation of the diamond 502. As shown between FIG. 5B and FIG. 5C, the diamond 502 may be rotated along a certain axis relative to a world frame. Such movement may be influenced by one or more people 506 in the crowd. A control system may then determine the direction and amount of rotation of the diamond 502 using the position sensor 504 within the diamond 502. Further, the control system may direct light sources 508 and/or mirrors 510 to change locations and/or orientations in order to cause a projected cube of light 512 to rotate in the same direction by the same amount as the diamond 502 relative to the world frame.

Figure 5D:
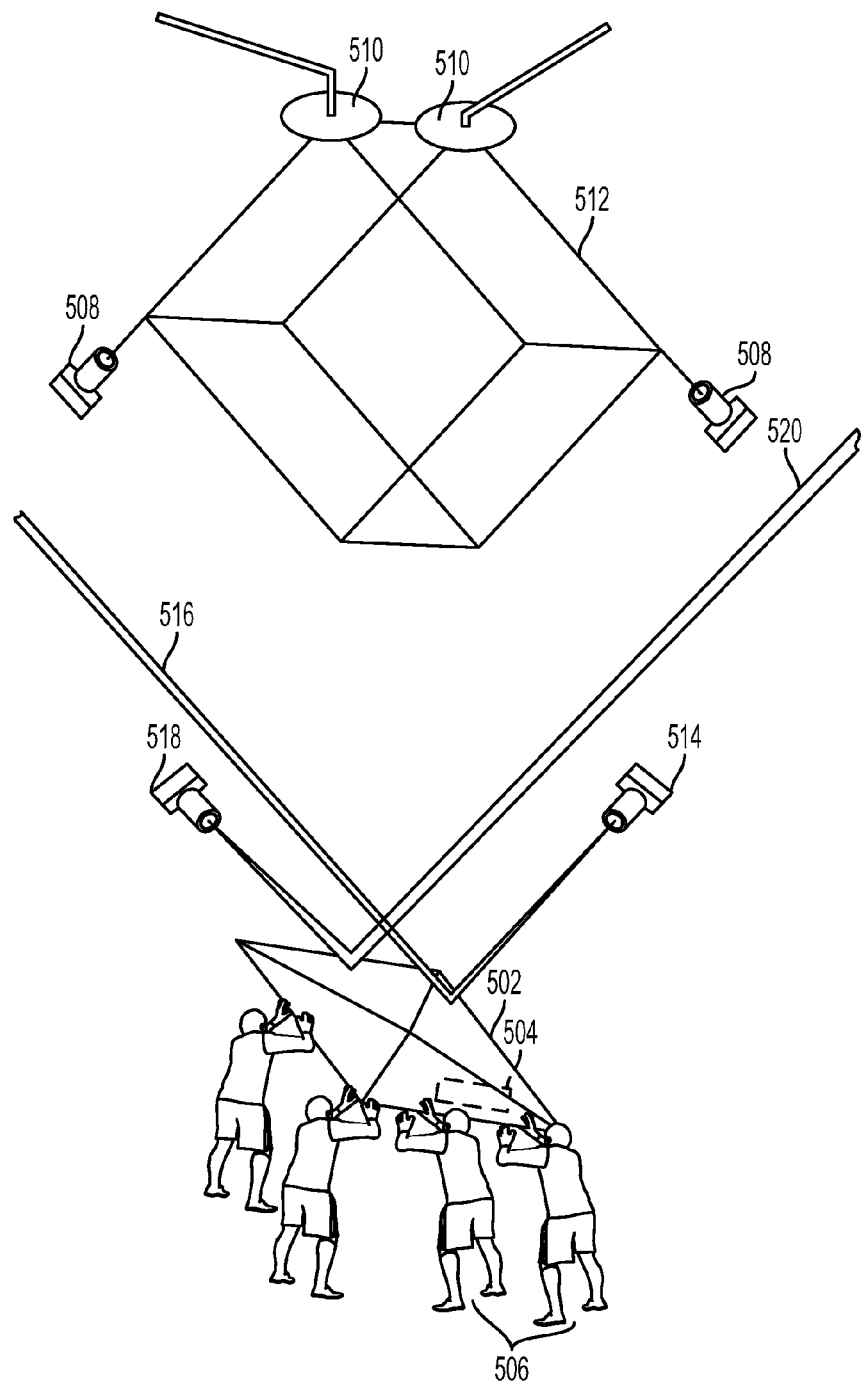

Additionally, as shown by FIG. 5D, additional light sources can be used to take advantage of the geometry of the diamond 502. For instance, a first light source 514 may bounce a first beam of light 516 off of one surface of the diamond 502. Additionally, a second light source 518 can bounce a second beam of light 520 off of a second surface of the diamond 502. In some examples, the control system may coordinate the translation and/or orientation of the light sources 514 and 518 to make the reflected light beams 516 and 520 synchronize with the cube of light 512. For instance, the reflected light beams 516 and 520 may be controlled to always run parallel to sides of the cube of light 512 as shown in FIG. 5D.

Figure 6:
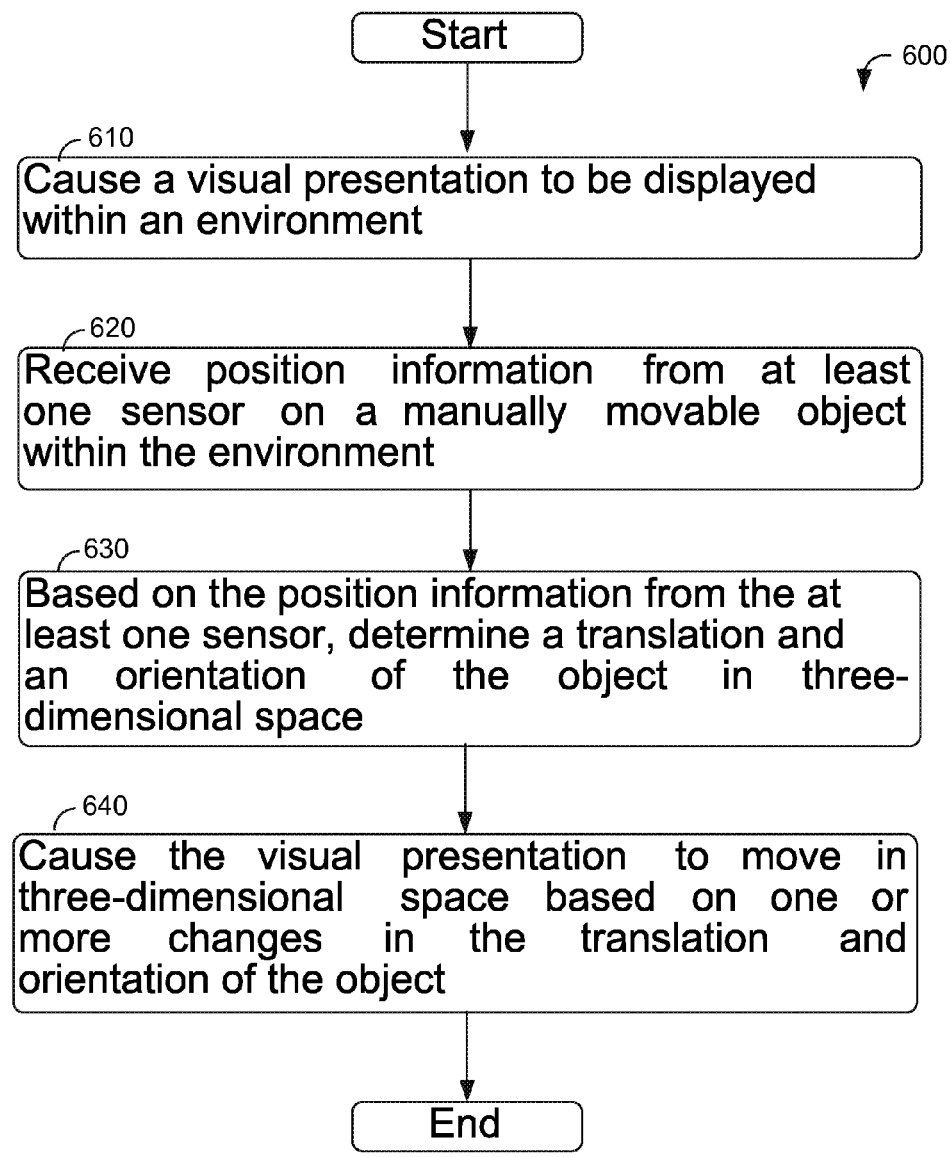
FIG. 6 is a block diagram of a method, according to an example embodiment.

FIG. 6 is a block diagram of a method, according to an example embodiment. The method 600 may be carried out by a single control system or by multiple computing systems working together. The control system(s) may communicate with the moveable object and/or with other components that execute aspects of the presentation. In further examples, all or some of method 600 may be carried out by one or more computing systems located on the moveable object and/or or by computing systems located on other system components. In some examples, the blocks of the method 600 may be combined, separated into additional blocks, and/or carried out in a different order than shown. Other configurations are also possible.

Method 600 may involve causing a visual presentation to be displayed within an environment, as shown by block 610. A visual presentation may include any of a number of different types of visual components, including projected light beams, graphical elements, and/or other physical components. The environment could be any environment large enough to hold a group of people, such as a concert venue, a sports stadium, or a large ship. In some examples, the visual presentation may additionally include various non-visual aspects as well.

Method 600 may further involve receiving position information from at least one sensor on a manually movable object within the environment, as shown by block 620. For instance, an object could be deployed by dropping it into a crowd, handing it to an individual person, or placing it somewhere in an environment before people arrive. The manually movable object could be any type of crowd-directable object with one or more of a number of different types of sensors that may assist in determining the object's motion. The position information could include information relating to six degrees of freedom, or less degrees of freedom in some cases. The position information may also include other types of information, such as information about acceleration or vibration of the object.

In additional examples, the position information may require certain processing, which could be carried out locally by computing systems on the object, by a separate control system, or by both in combination. Some sensing systems may also require additional external hardware components or systems, such as witness cameras. Information relating to the position of the sensor(s) may also be received from these additional hardware components or systems.

Method 600 may further involve determining a translation and an orientation of the object based on the position information, as shown by block 630. The position information for the object may include the translation and/or orientation of the object along six degrees of freedom. Some objects may only be able to move and/or rotate along certain degrees of freedom, in which case the position information may include only the translation and/or orientation of the object along pathways that the object can travel.

Method 600 may additionally involve causing the visual presentation to move in three-dimensional space based on one or more changes in the translation and orientation of the object, as shown by block 640. For instance, one or more light beams may be caused to move in translation and/or orientation in amounts that correspond to detected movements in translation and/or orientation by the object. In addition to or instead of controlling the location of light beams, the colors, beam widths, and/or other properties of light beams may be modified based on object movements as well. For example, by rotating a ball 360 degrees in a circle, people in a crowd may be able to cause a light beam to sequentially change colors through the entire visible spectrum of colors.

Non-visual aspects of a presentation could be dependent on movements of the object as well. For example, the amplitude and/or frequency of sound effects may depend on movements of the object. For instance, an accelerometer may be included within the object to measure the object's acceleration. As the acceleration increases, the amplitude and/or frequency of sound effects may increase by a proportional amount. In other examples, the sound effects and visual effects may be coordinated together. For instance, by rotating a large ball, people in a crowd may be able to cause projected light beams in the air to move and also cause the volume of music to increase at the same time.

Figure 7:
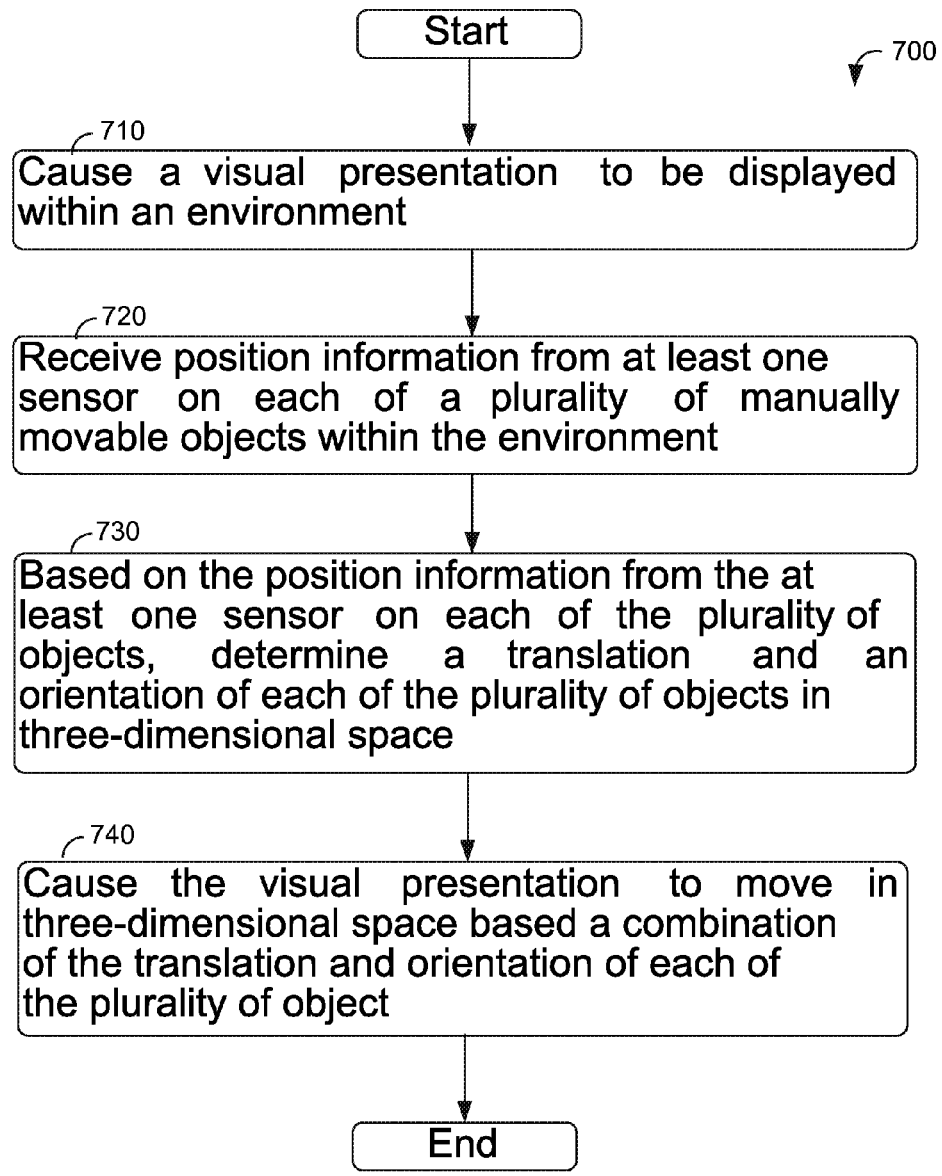
FIG. 7 is a block diagram of another method, according to an example embodiment.

FIG. 7 is a block diagram of another method, according to an example embodiment. The method 700 may be carried out by a single control system or by multiple computing systems working together. The control system(s) may communicate with a group of moveable objects and/or with other components that execute aspects of the presentation. In further examples, all or some of method 700 may be carried out by one or more computing systems located on the group of moveable objects and/or or by computing systems located on other system components. In some examples, the blocks of the method 700 may be combined, separated into additional blocks, and/or carried out in a different order than shown. Other configurations are also possible.

Method 700 may involve causing a visual presentation to be displayed within an environment, as shown by block 710. The visual presentation and environment may include any of the types previously described, such as those described with respect to Method 600

Method 700 may further involve receiving position information from at least one sensor on two or more manually movable objects within the environment, as shown by block 720. For instance, each of the objects could be deployed to different people within a crowd, such as by dropping the objects onto different locations in the environment, handing them to different people, or placing them at different locations in an environment before people arrive. The manually movable objects could be any type of crowd-directable objects with one or more of a number of different types of sensors that may assist in determining the motion. The position information could include information relating to six degrees of freedom, or less degrees of freedom in some cases. The position information may also include other types of information, such as information about acceleration or vibration of the objects.

Method 700 may further involve determining a translation and an orientation of each of the objects based on the position information, as shown by block 730. The position information for each object may include the translation and/or orientation of the object along six degrees of freedom. Some objects may only be able to move and/or rotate along certain degrees of freedom, in which case the position information may include only the translation and/or orientation of those objects along pathways that the objects can travel.

Method 700 may additionally involve causing the visual presentation to move in three-dimensional space based on a combination of the translation and orientation of the objects, as shown by block 740. For instance, one or more light beams may be caused to move in translation and/or orientation in amounts that correspond to a mathematical average or different combination of the translations and/or orientations of each of the objects. In addition to or instead of controlling the location of light beams, the colors, beam widths, and/or other properties of light beams may be modified based on a combination of each of the object's movements as well. By combining translation and/or orientation information from a number of different objects located at different places within the environment, people within the crowd at different locations may each be able to provide some degree of control over a presentation in real time.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagram, scenarios, and flow charts may be combined with one another, in part or in whole.

A block that represents a processing of information, such as a block of method 600 and/or method 700 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   causing a three-dimensional visual presentation to be displayed within an environment, wherein the three-dimensional visual presentation comprises a plurality of visible beams of light that are disconnected from a manually movable object within the environment;
   receiving position information from at least one sensor on the manually movable object within the environment;
   based on the position information from the at least one sensor, determining a translation and a rotation of the manually movable object in three-dimensional space; and
   causing the plurality of visible beams of light to translate and rotate in three-dimensional space in a same direction as the determined translation and rotation of the manually movable object by an amount that is a scalar multiple of the determined translation and rotation of the manually movable object in three-dimensional space.

2. The method of claim 1, wherein the the plurality of visible beams of light form a shape that encompasses the object.

3. The method of claim 1, wherein the plurality of visible beams of light form a cube of light, wherein a corner of the cube of light is positioned over the object.

4. The method of claim 1, further comprising:
   based on the position information from the at least one sensor, determining a frequency for one or more sounds, and
   causing the one or more sounds to be played with the determined frequency.

5. The method of claim 1, further comprising:
   based on the position information from the at least one sensor, determining at least one color; and
   causing the plurality of visible beams of light to have the determined at least one color.

6. The method of claim 1, wherein the object comprises at least one reflective surface, and wherein the visual presentation comprises at least one projected ray of light that is reflected off the at least one reflective surface.

7. The method of claim 1, further comprising receiving acceleration information from the at least one sensor, wherein:
the acceleration information is indicative of acceleration of the object; and
at least one aspect of the visual presentation corresponds to the acceleration information.

8. The method of claim 1, further comprising receiving vibration information from the at least one sensor, wherein:
the vibration information is indicative of vibration of the object; and
at least one aspect of the visual presentation corresponds to the vibration information.

9. The method of claim 1, wherein the scalar multiple is equal to one, such that the amount of translation and rotation of the plurality of visible beams of light is equal to the amount of translation and rotation of the manually movable object.

10. A system comprising:
a manually movable object that contains at least one sensor that is configured to detect position information; and
a control system configured to:
cause a three-dimensional visual presentation to be displayed within an environment, wherein the three-dimensional visual presentation comprises a plurality of visible beams of light that are disconnected from the manually movable object;
receive the position information from the at least one sensor on the manually movable object that is deployed within the environment;
based on the position information from the at least one sensor, determine a translation and a rotation of the manually movable object in three-dimensional space; and
cause the visual presentation to translate and rotate in three-dimensional space in a same direction as the determined translation and rotation of the manually movable object by an amount that is a scalar multiple of the determined translation and rotation of the manually movable object in three-dimensional space.

11. The system of claim 10, further comprising one or more laser projectors, wherein the control system is configured to cause the one or more laser projectors to project the plurality of visible beams of light as laser beams during the visual presentation.

12. The system of claim 11, further comprising at least one mirror, wherein one or more of the plurality of visible beams of light are reflected off of the at least one mirror.

13. The system of claim 12, wherein the one or more laser projectors and the at least one mirror are coupled to one or more robot arms, and wherein the control system is further configured to coordinate movements of the one or more robot arms during the visual presentation.

14. The system of claim 12, wherein the plurality of visible beams of light and at least one reflected ray of light that is reflected off of the at least one mirror form a shape that encompasses the object.

15. The system of claim 14, wherein the shape comprises a cube of light, wherein a corner of the cube of light is positioned over the object.

16. The system of claim 10, further comprising one or more sound speakers, wherein the control system is configured to:
determine an amplitude for one or more sounds based on the position information from the at least one sensor; and
cause the one or more sound speakers to play the one or more sounds with the determined amplitude during the presentation.

17. The system of claim 10, further comprising one or more light projectors, wherein the control system is configured to cause the one or more light projectors to project the plurality of visible beams of light, wherein a color of the plurality of visible beams of light corresponds to an orientation of the object.

18. The system of claim 10, wherein the manually movable object is a helium-filled ball.

19. The system of claim 10, wherein the scalar multiple is equal to one, such that the amount of translation and rotation of the plurality of visible beams of light is equal to the amount of translation and rotation of the manually movable object.

20. A method comprising:
causing a three-dimensional visual presentation to be displayed within an environment, wherein the three-dimensional visual presentation comprises a plurality of visible beams of light that are disconnected from a plurality of separate manually movable objects within the environment;
receiving position information from at least one sensor on each of the plurality of separate manually movable objects within the environment;
based on the position information from the at least one sensor on each of the plurality of objects, determining an amount of translation and rotation of each of the plurality of separate manually movable objects in three-dimensional space; and
causing the plurality of visible beams of light to translate and rotate in three-dimensional space based on a mathematical average of the amount of translation and rotation of each of the plurality of separate manually movable objects.

* * * * *